INVENTOR
WILLY OLSEN

By Hurwitz & Rose
ATTORNEYS

# United States Patent Office 3,613,229
Patented Oct. 19, 1971

3,613,229
METHOD OF MAKING TRANSFORMER CORES
Willy Olsen, Mount Vernon, Ill., John B. McKee, Glendale, Mo., and William M. Pahel, Salem, Ill.; said Olsen and said Pahel assignors to Olsen Magnetic, Inc., Mount Vernon, Ill., and said McKee assignor to Wagner Electric Corporation, Newark, N.J.
Filed Dec. 31, 1969, Ser. No. 889,512
Int. Cl. H01f 7/06
U.S. Cl. 29—605
10 Claims

ABSTRACT OF THE DISCLOSURE

An improved method of making transformer cores comprises winding a plurality of turns of grain-oriented magnetic material, cutting the turns along a radial line extending perpendicular to the turns, arranging the resulting laminations in groups comprising adjacent laminations such that the laminations in each group increase in length from the innermost to outermost lamination, relocating at least one lamination of each group to another position in that group wherein it lies between two shorter laminations, tightly nesting the various groups with one another and joining the ends of all laminations to form a closed core wherein the ends of all but the relocated laminations form butt joints and wherein the ends of said relocated laminations form overlapped joints.

BACKGROUND OF THE INVENTION

The present invention relates generally to a method of making formed transformer cores, and more particularly to an improved method for making a formed transformer core having excellent magnetic characteristics and which may be simply and economically assembled.

In a standard form of transformer construction a coil structure is provided with a window having a magnetic core passing therethrough and enclosing at least one leg of the coil. The core in this type of structure is normally assembled from a plurality of groups of laminations to provide a generally rectangular or square core configuration. In discussing such a core herein, the term "legs" refers to the core member or members passing through the window in the coil and the member or members parallel thereto; the term "yokes" refers to the members joining the legs.

In one form of coil construction the ends of each lamination are butt jointed with all of the butt joints lying in the same leg. In manufacturing the core, a strip of grain-oriented magnetic material is wound into a plurality of concentric turns and then cut along a radial line extending perpendicular to the turns. The laminations resulting from the cut are assembled in groups, the groups are nested within one another, and the structure is then shaped and heat treated to relieve stresses in the material. The groups of laminations are then separated and individually assembled on the coil with the joints located in the coil window. An example of such a core construction may be found in U.S. Pat. 3,107,415 to Ellis.

The aforesaid type of structure suffers from a relatively low magnetic efficiency. Specifically, due to the facts that: (1) all of the joints of the laminations lie along one leg of the core; (2) all of the joints are of the butt type; and (3) perfect abutment can not be achieved in practice; an air gap exists across the entire core leg along the butt joint, thereby reducing the magnetic efficiency, particularly where overall high space factors are employed.

In U.S. Pat. 3,328,737 to Olsen the problem of poor magnetic efficiency in this general type of core construction is substantially alleviated. More particularly, at least one lamination in each group of laminations is overlapped. In addition, the butt joints in each group of laminations are staggered or offset perform a zig-zag pattern which advances about the core in either a clockwise or counterclockwise direction. Due to this overall arrangement of the individual laminations, the various butt joints in adjacent lamination groups are mis-aligned, eliminating a continuous air gap across the core leg. In adidtion, the overlapped joint in any group of laminations is staggered, because of the zig-zag pattern, relative to all other overlapped joints. Thus, the usual objection to overlapped joints that the width of the core is greatly increased is thereby obviated. On the other hand, a continuous magnetic path about the core is provided for each group of laminations by the overlapped joint in that group. It was found that this structure, which minimizes the leakage flux generated at each butt joint and which further provides a continuous magnetic path through at least one location in each group of laminations, increases the magnetic efficiency of the core by several percent.

In cutting the various laminations to length in accordance with the aforesaid Olsen patent, the laminations of each group are cut with a uniformly increasing length to compensate for the increase in length of each lamination as the diameter of the core increases. The overlapping lamination in each group is cut to a length out of proportion to its position in the core so as to provide a requisite overlap. This sequence of cutting operations, while by no means difficult, is not quite as simple as the single cut operation required for the formation of laminations in the above-described Ellis patent.

It is an object of the present invention to provide a method whereby a single cutting operation such as performed in the Ellis patent can be employed in making a transformer having the advantageous magnetic characteristics of the transformer core structure disclosed in the Olsen patent.

It is another object of the present invention to provide a method for making a transformer core comprising a plurality of butt-jointed concentric laminations with individual overlap-joined-jointed laminations being interspersed therein wherein all laminations are formed by a single cut through a wound core structure.

It is still another object of the present invention to provide a meth for making a transformer core in which a plurality of laminations are formed from a single cut of a wound core structure and wherein the final core assembly comprises a plurality of butt-jointed laminations arranged in concentric fashion and offset from one another in a zig-zag pattern wherein individual overlap-jointed laminations are interspersed among the but-jointed laminations.

SUMMARY OF THE INVENTION

In accordance with the principles of the present invention the aforesaid objects are achieved by providing a radial cut in a wound core structure, separating the resultant laminations into different groups, and relocating one of the larger laminations in each group to a position between two shorter laminations in that group. When the ends of the remaining laminations are then butt-jointed and the various lamination groups nested with one another, the ends of the relocated laminations form overlapped joints. Thus, with only a single cut of a wound core, simple relocation of one or more laminations within their lamination groups provides the resultant Olsen core structure having the desired improved magnetic characteristics.

The above and still further objects, features and advantages of the present invention will become apparent upon consideration of the following detailed description of specific embodiments thereof, especially when taken in conjunction with the accompanying drawings, wherein:

DESCRIPTION OF THE PREFERRED EMBODIMENTS

Figure 1:
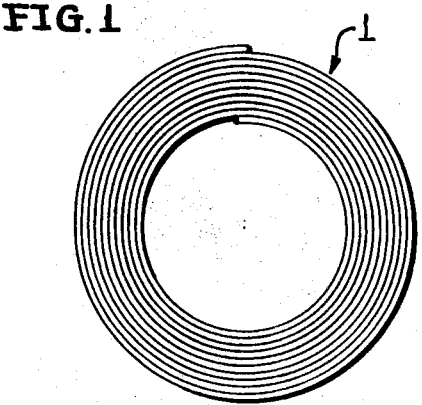
FIG. 1 is a view in end elevation illustrating how the turns of a core are wound in accordance with the principles of the present invention.

Referring now specifically to FIG. 1 of the accompanying drawings there is illustrated a wound core structure 1 having a plurality of turns of grain-oriented magnetic strip material wound concentrically about one another. The turns form a closed loop which preferably has a substantially annular configuration, but may have any other desired configuration in which the turns are wound about one another. The thickness and width of the magnetic strip and the number of turns to be wound are determined by the required capacity of the completed core and the dimensions of the preformed winding from which the core is to be assembled. Core 1 may be wound by any of several well known means and may be annealed after it is wound in a substantially annular configuration as shown; alternatively, the turns of the core may be retained in the annular configuration or closed loop by any suitable means, such as precurving during winding.

Figure 2:
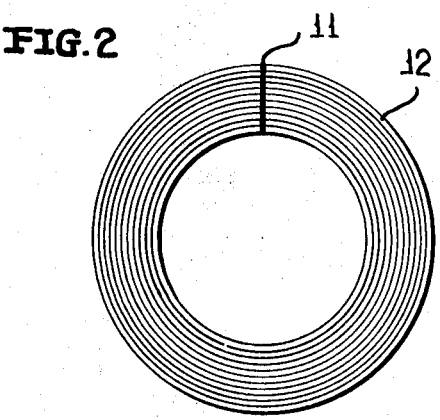
FIG. 2 is a view in end elevation of the core of FIG. 1 illustrating how the turns are cut to provide the various laminations.

Referring to FIG. 2, core 1 is next cut or otherwise severed along a radial line 11 substantially at right angles to the turns to provide independent laminations 12. The laminations are equal in number to the turns in core 1 before cutting. In order to prevent spreading by formation of burrs during cutting of core 1, it may be necessary to clamp the core adjacent each side of line 11 by suitable means (not illustrated). If core 1 has a substantially annular configuration, as illustrated, the cut along line 11 is along a diameter of the core; however, the cut along line 11 may be varied somewhat to accommodate a special purpose in various specific cores embodying this invention.

Figure 3:
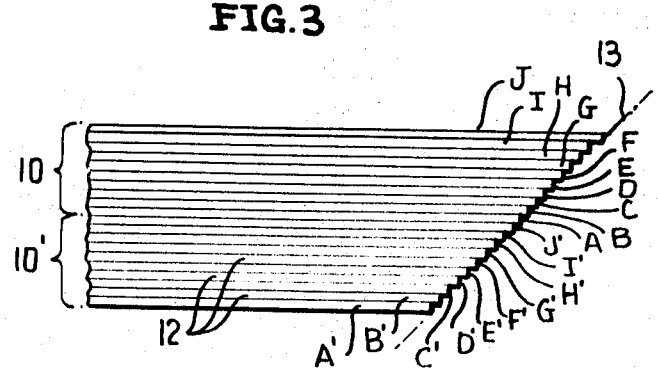
FIG. 3 is a partial end view illustrating the relative lengths of the various laminations of two complete core groups formed as a result of the cut illustrated in FIG. 2.
Figure 4:
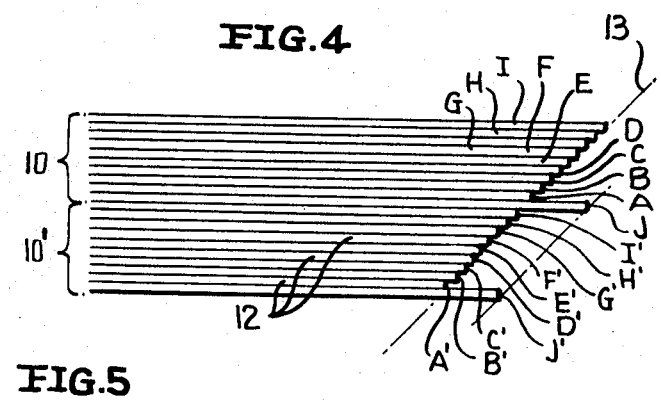
FIG. 4 is a further end view illustrating the relative lengths of the various laminations after one lamination in each group has been relocated within that group.

After core 1 is cut, laminations 12 are separated into groups, one end of each of the laminations into such groups, 10 and 10', being illustrated in FIG. 3. The laminations of group 10 are designated by the reference letters A through J inclusive in sequence from the innermost and shortest to outermost and longest lamination. Likewise, the laminations in group 10' are designated by the reference letters A' through J' inclusive in sequence from the innermost to the outermost lamination. When core 1 is cut, the concentric relationship between the individual turns produces uniformly increasing lengths in the resulting laminations 12. A dashed line, generally designated by the referenced numeral 13, has been drawn in FIG. 3 along the ends of the laminations of the two groups to illustrate the continuous pattern of uniform lengths. If the laminations, arranged in the order illustrated in FIG. 3, are further arranged so that adjacent laminations are offset from one another, and the ends of each lamination is joined in a butt-joint, the core configuration described in the aforesaid Ellis patent results. More specifically, each lamination of the resulting core would form a joint which is offset or staggered with respect to the joint of each adjacent lamination. As described above, this core construction has a poorer magnetic efficiency than the construction described in the Olsen patent. In order to provide the improved magnetic efficiency of the Olsen core construction, it is necessary not only to provide a zig-zag pattern of butt-jointed laminations, so that no two butt-joints in adjacent groups are radially aligned, but also to provide a number of spaced overlapped lamination joints throughout the core thickness. The spaced overlapped joints are achieved in accordance with the present invention by relocating one lamination in each group (for example, lamination J in group 10 and lamination J' in group 10') to another position in its group wherein the laminations immediately adjacent the relocated lamination are shorter than the relocated lamination. More specifically, and referring to FIG. 4, lamination J in group 10 is shown removed from its position in FIG. 3 and placed instead in front of lamination A. Similarly, lamination J' in group 10' is removed from its position in FIG. 3 to a position in front of lamination A'. Lamination J is now surrounded by laminations I' and A, both of which are significantly shorter than lamination J. Likewise, the laminations on either side of lamination J' are both shorter than lamination J'.

Figure 5:
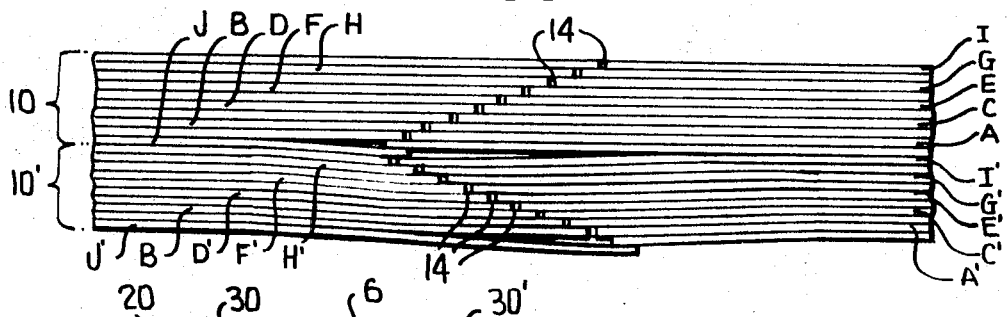
FIG. 5 is an illustration of the joint formed by the two groups of laminations of FIG. 4.

In assembling the core, the lamination of each core group are staggered so that when formed into a ring or rectangular configuration (by techniques described in the aforesaid Olsen and Ellis patents), individual butt joints are formed between the ends of laminations A through I and A' through I', the joints being offset relative to one another as illustrated in FIG. 5. It is known that when such butt joints are employed a true butting relationship is never actually attained; rather, small air gaps 14 exist between the opposed ends of each butt-jointed lamination. The effects of these air gaps 14, which would otherwise deteriorate the magnetic efficiency of the core structure, are overcome by virtue of the relocation of laminations J and J'. More specifically, since laminations J and J' are disposed between laminations shorter than themselves, their ends must overlap in the region of the core joint. The interspersing of overlap-jointed laminations throughout the core thickness provides a continuous magnetic path about the core in each group of laminations. As described in the aforementioned Olsen patent, this structure minimizes the leakage flux generated at each butt joint and thereby increases the magnetic efficiency of the core by several percent.

Another important feature of the structure illustrated in FIG. 5 is the zig-zag pattern employed for the various butt joints. More specifically, the butt joint of each lamination is offset relative to the butt joint of its two adjacent laminations in any lamination group. For example, the offset of the butt joints in group 10 of FIG. 5 are staggered from left to right proceeding outwardly from the innermost lamination J of group 10. The joints of group 10' extend from right to left when proceeding from innermost lamination J' to form a zig-zag pattern of joints. In addition, the joints of group 10 are offset radially (transversely to the length of the leg) relative to the joints of group 10'. That is, the joints of the laminations in group 10 are spaced approximately half-way between the adjacent joints in group 10'. The offset spacing therefore has two aspects: first, the offset between adjacent laminations in any group proceeds in an opposite direction to offsets between adjacent laminations in an adjacent group; and second, no butt joint in any group is radially aligned with a butt joint in its own or an adjacent group. In this manner, the leakage flux at the butt joint of each lamination does not interact or in any way affect the leakage flux at the butt joints in other groups; nor does the leakage flux at any butt joint tend to saturate the metal in the region of the leakage flux of the other joints.

Figure 6:
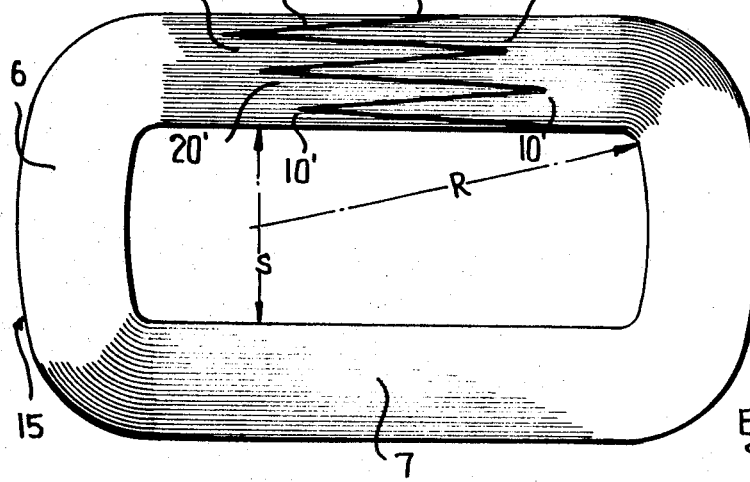
FIG. 6 is an end view in elevation of a complete core fabricated in accordance with the principles of the present invention.

In the specific example chosen for illustration herein, and as described in the aforesaid Olsen patent, the outermost lamination of each group is provided with an overlap-joint from a lamination in the next group which thus provides at least one continuous magnetic path about the core for each group of laminations. Normally, the objection to the use of overlapped joints is that such a structure increases the size of the core due to the double thickness of metal present at each overlap. However, as can be seen by reference to FIG. 6 of the accompanying drawings, each of the overlap-joints lies along an independent transverse or radial path through the core leg; thus, the increase in thickness at any point due to a single overlap of one lamination is so small relative to the large number of laminations as to have no appreciable effect on the overall thickness of the core leg. In FIG. 6 there is illustrated a magnetic core completed and assembled according to the principles of the present invention. The core 15 is formed from a plurality of internested groups of laminations designated 10', 10, 20', 20, 30', 30, etc. wherein group 10' is the innermost group and has the shortest laminations and group 30 is the outermost group having the longest laminations. The various groups of laminations all have the same basic configurations as described above for groups 10 and 10'. The core is generally rectangular in shape having a pair of parallel legs 6 and 7 joined by curved end yoke 8 and 9. The legs 6 and 7 have a space factor of between 96 and 99 percent, while the curved yokes 8 and 9 and the corners joining the yokes to legs 6 and 7 have a space factor of approximately 90 to 95 percent. As described in the aforesaid Olsen patent, it has been found desirable, though not essential, to maintain the radius of curvature of the yokes equal to approximately two times the distance between the intermost lamination of the opposing legs 6 and 7. Expressing this mathematically, with R equal to the radius of curvature of the yoke and S equal to the distance between the inermost laminations of legs 6 and 7, R is equal to 2S.

The actual assembly of the core from the various groups of laminations may proceed in accordance with the techniques described in either of the aforesaid Ellis and Olsen patents. This portion of the method of core assembly is conventional and no claim is made herein to said portion per se. The crux of the present invention is the relocation of individual laminations from their normal position in a sequence of laminations of uniformly increasing length to positions wherein the relocated laminations lie between two shorter laminations and therefore provide an overlap joint when the other laminations are butt-jointed.

It is to be understood that the present invention does not require the relocation of the longest lamination in each group to a position in front of the shortest lamination in each group. On the contrary, any one or more laminations in any group may be relocated to lie between shorter lamination of the same group.

While we have described and illustrated specific embodiments of our invention, it will be clear that variations of the details of construction which are specifically illustrated and described may be resorted to without departing from the true spirit and scope of the invention as defined in the appended claims.

We claim:

1. A method for making a magnetic core comprising the steps of:
    winding a predetermined number of turns of grain-oriented magnetic strip material to form a core loop;
    cutting the core loop along a line extending radially relative to said core loop;
    arranging the laminations in a plurality of groups wherein each group contains a plurality of laminations of increasing length and wherein said groups are inter-related so as to be capable of tightly nesting with one another;
    relocating at least one lamination in each group to a position wherein it lies between two laminations which are shorter than the relocated lamination; and
    tightly nesting said groups of laminations within one another such that the ends of said relocated laminations over-lap and the ends of the remaining laminations are butt-jointed.

2. The method of making a laminated magnetic core comprising the steps of:
    forming a core member having a plurality of laminations of grain-oriented magnetic strip material of increasing lengths located such that the ends of each lamination abut when said member is formed into a ring;
    relocating at least one of said laminations to a position in which it is adjacent two laminations shorter than said one lamination such that the ends of said one lamination overlap when said member is formed into a ring; and
    forming said member into said ring such that the ends of the at least one relocated lamination overlap and the ends of the laminations which are not relocated abut.

3. The method according to claim 2 wherein the step of forming comprises:
    winding a predetermined number of turns of said grain-oriented magnetic strip material to form a core loop; and
    cutting the core loop such that each turn is cut once and each turn corresponds to a respective one of said laminations.

4. The method according to claim 3 wherein the step of cutting is performed such that each turn is cut radially of said core loop.

5. The method according to claim 2 wherein the step of relocating comprises relocating a plurality of spaced laminations to respective spaced positions adjacent shorter laminations such that the ends of said spaced laminations overlap when said member is formed into a ring.

6. The method according to claim 5 further including the step of:
    forming said member into a ring such that the ends of all but said spaced laminations abut and the ends of said spaced laminations overlap.

7. The method according to claim 6 further comprising shaping said ring into a generally rectangular configuration.

8. The method according to claim 2 wherein, prior to the step of relocating, there is included the step of arranging said laminations into groups containing a plurality of laminations of increasing lengtth, said groups being related such that they are capable of tightly nesting within one another, and wherein said step of relocating includes relocating one lamination from each group to a respective position wherein it lies between two shorter laminations.

9. The method according to claim 8 wherein the position to which said one lamination is relocated is within the group in which said lamination was located before relocation.

10. The method according to claim 9 wherein the step of forming comprises:
    winding a predetermined number of turns of said grain-oriented magnetic strip material to form a core loop; and
    cutting the core loop such that each turn is cut once and each turn corresponds to a respective one of said laminations.

References Cited

UNITED STATES PATENTS

| | | | |
|---|---|---|---|
| 3,107,415 | 10/1963 | Ellis | 29—605 X |
| 3,186,067 | 6/1965 | Somerville | 29—609 X |
| 3,328,737 | 6/1967 | Olsen | 29—609 X |

JOHN F. CAMPBELL, Primary Examiner
C. E. HALL, Assistant Examiner

U.S. Cl. X.R.
29—609; 336—211, 216, 217